United States Patent
Liu et al.

(10) Patent No.: US 11,892,920 B2
(45) Date of Patent: Feb. 6, 2024

(54) METHOD, ELECTRONIC DEVICE, AND PROGRAM PRODUCT FOR FAILURE HANDLING

(71) Applicant: EMC IP Holding Company LLC, Hopkinton, MA (US)

(72) Inventors: Bing Liu, Tianjin (CN); Lingdong Weng, Beijing (CN); Zheng Li, Beijing (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/522,287

(22) Filed: Nov. 9, 2021

(65) Prior Publication Data

US 2023/0086852 A1 Mar. 23, 2023

(30) Foreign Application Priority Data

Sep. 17, 2021 (CN) .......................... 202111125365.3

(51) Int. Cl.
| G06F 11/07 | (2006.01) |
| G06F 11/20 | (2006.01) |
| G06F 11/14 | (2006.01) |
| G06F 11/18 | (2006.01) |

(52) U.S. Cl.
CPC .......... G06F 11/203 (2013.01); G06F 11/142 (2013.01); G06F 11/1471 (2013.01); G06F 11/181 (2013.01); G06F 11/2033 (2013.01)

(58) Field of Classification Search
CPC .. G06F 11/203; G06F 11/142; G06F 11/1471; G06F 11/181; G06F 11/2033
See application file for complete search history.

(56) References Cited

U.S. PATENT DOCUMENTS

| 6,332,204 | B1 * | 12/2001 | Russell | G11B 20/1883 |
| | | | | 714/704 |
| 7,506,224 | B2 * | 3/2009 | Ejiri | G06F 11/2221 |
| | | | | 714/2 |
| 10,824,352 | B2 * | 11/2020 | Ioannou | G06F 11/073 |
| 2001/0010085 | A1 * | 7/2001 | Rafanello | G11B 20/1883 |
| | | | | 714/10 |
| 2016/0110246 | A1 * | 4/2016 | Lv | G06F 11/0751 |
| | | | | 714/6.12 |
| 2017/0147209 | A1 * | 5/2017 | Lee | G11C 29/52 |
| 2019/0179741 | A1 * | 6/2019 | Liu | G11C 16/00 |
| 2020/0133758 | A1 * | 4/2020 | Liu | G06F 3/0689 |

* cited by examiner

*Primary Examiner* — Matthew M Kim
*Assistant Examiner* — Kyle Emanuele
(74) *Attorney, Agent, or Firm* — WOMBLE BOND DICKINSON (US) LLP

(57) ABSTRACT

Embodiments of the present disclosure relate to a method, an electronic device, and a computer program product for failure handling. This failure handling method includes determining a sector set failure type associated with at least one failed sector set of a disk; if the sector set failure type indicates that the number of failed sector sets in the at least one failed sector set is greater than a first threshold number, generating an instruction for replacing the disk; and otherwise performing at least one of the following: migrating data from a failed sector set in which the number of failed sectors is greater than a second threshold number to a spare sector set, and performing a failure recovery for a failed sector set in which the number of failed sectors is less than or equal to the second threshold number.

17 Claims, 6 Drawing Sheets

METHOD, ELECTRONIC DEVICE, AND PROGRAM PRODUCT FOR FAILURE HANDLING

CROSS-REFERENCE TO RELATED APPLICATION

This patent application claims priority, under 35 U.S.C. § 119, of Chinese Patent Application No. 202111125365.3, filed Sep. 17, 2021, which is incorporated by reference in its entirety.

TECHNICAL FIELD

Embodiments of the present disclosure generally relate to computer technologies, and in particular to a method, an electronic device, and a computer program product for failure handling, which may be used in the fields of disk management and data protection.

BACKGROUND

Many techniques have been proposed for preventing data loss due to disk failures. However, these technologies usually focus on the entire disk failure, and rarely pay attention to the fine-grained disk health condition. At the same time, since conventional disk failure determining and disk failure handling techniques focus on the entire disk, when it is determined that there is a failure in the disk, unified processing is also performed on the entire disk. In fact, when failures occur on a disk, these failures often occur only in some of the sectors in the disk. Therefore, the conventional disk failure determining and disk failure handling techniques are insufficient in fineness, which cannot support fine-grained processing of disks, and can hardly meet the needs of users and administrators of disks.

SUMMARY OF THE INVENTION

Embodiments of the present disclosure provide a method, an electronic device, and a computer program product for failure handling.

In a first aspect of the present disclosure, a failure handling method is provided. This method includes: determining a sector set failure type associated with at least one failed sector set of a disk; if the sector set failure type indicates that the number of failed sector sets in the at least one failed sector set is greater than a first threshold number, generating an instruction for replacing the disk; and if the sector set failure type indicates that the number of failed sector sets in the at least one failed sector set is less than or equal to the first threshold number, performing at least one of the following: migrating data from a failed sector set, in the at least one failed sector set, in which the number of failed sectors is greater than a second threshold number to a spare sector set, and performing a failure recovery for a failed sector set, in the at least one failed sector set, in which the number of failed sectors is less than or equal to the second threshold number.

In a second aspect of the present disclosure, an electronic device is provided. The electronic device includes: at least one processing unit; and at least one memory coupled to the at least one processing unit and storing instructions for execution by the at least one processing unit, wherein the instructions, when executed by the at least one processing unit, cause the device to perform actions including: determining a sector set failure type associated with at least one failed sector set of a disk; if the sector set failure type indicates that the number of failed sector sets in the at least one failed sector set is greater than a first threshold number, generating an instruction for replacing the disk; and if the sector set failure type indicates that the number of failed sector sets in the at least one failed sector set is less than or equal to the first threshold number, performing at least one of the following: migrating data from a failed sector set, in the at least one failed sector set, in which the number of failed sectors is greater than a second threshold number to a spare sector set, and performing a failure recovery for a failed sector set, in the at least one failed sector set, in which the number of failed sectors is less than or equal to the second threshold number.

In a third aspect of the present disclosure, a computer program product is provided. The computer program product is tangibly stored on a non-transitory computer-readable medium and includes machine-executable instructions, wherein the machine-executable instructions, when executed, cause a machine to perform any step of the method described according to the first aspect of the present disclosure.

The Summary of the Invention part is provided to introduce the selection of concepts in a simplified form, which will be further described in the Detailed Description below. The Summary of the Invention part is not intended to identify key features or essential features of the embodiments of the present disclosure, nor is it intended to limit the scope of the embodiments of the present disclosure.

BRIEF DESCRIPTION OF THE DRAWINGS

The above and other objectives, features, and advantages of the present disclosure will become more apparent by describing example embodiments of the present disclosure in more detail in combination with the accompanying drawings. In the example embodiments of the present disclosure, the same reference numerals generally represent the same parts.

Identical or corresponding numerals represent identical or corresponding parts in various accompanying drawings.

DETAILED DESCRIPTION

Figure 1:
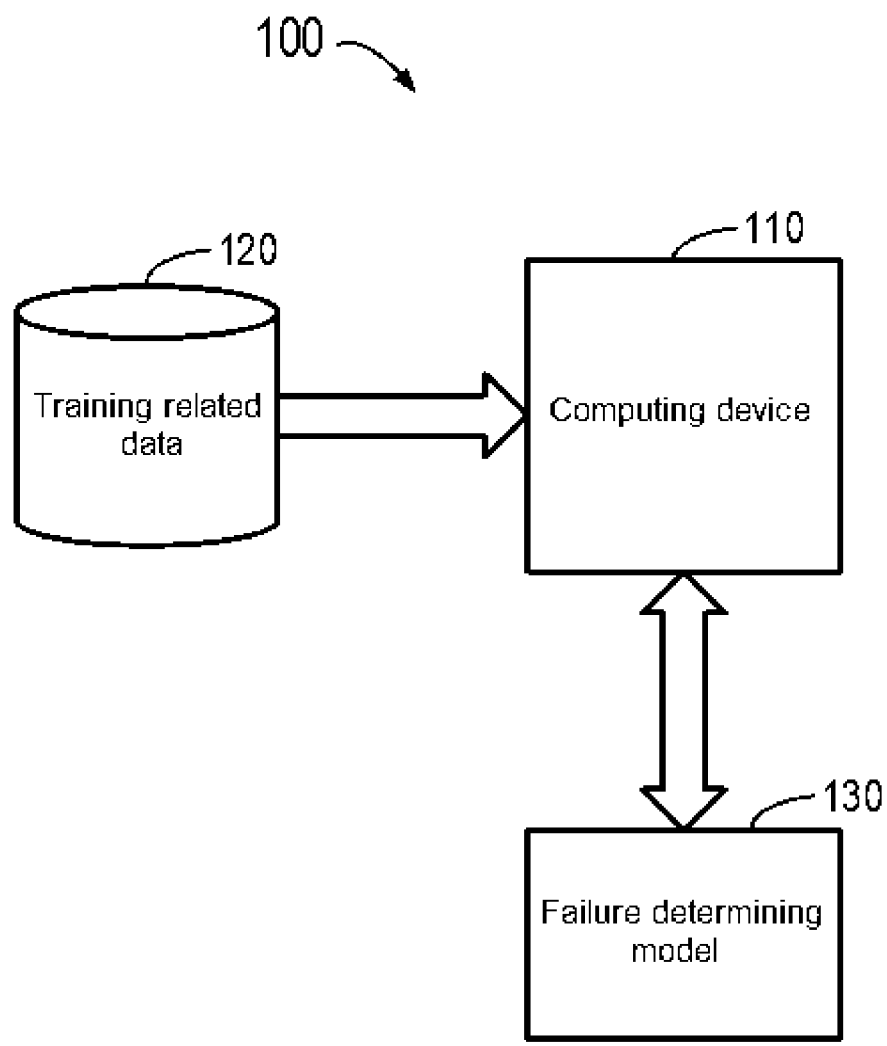
FIG. 1 illustrates a schematic diagram of model training environment 100 in which a device and/or a method according to embodiments of the present disclosure may be implemented.

Preferred embodiments of the present disclosure will be described in more detail below with reference to the accompanying drawings. Although the preferred embodiments of the present disclosure are shown in the accompanying drawings, it should be understood that the present disclosure may be implemented in various forms and should not be limited by the embodiments set forth herein. Rather, these embodiments are provided to make the present disclosure more thorough and complete and to fully convey the scope of the present disclosure to those skilled in the art.

As used herein, the term "include" and variations thereof mean open-ended inclusion, for example, "including but not limited to." Unless specifically stated, the term "or" means "and/or." The term "based on" means "based at least in part on." The terms "an example embodiment" and "an embodiment" mean "at least one embodiment." The term "another embodiment" means "at least one additional embodiment." The terms "first," "second," and the like may refer to different or identical objects. Other explicit and implicit definitions may also be included below.

As described above in the Background section, conventional disk failure determining and disk handling techniques are insufficient in fineness, which cannot support fine-grained processing of disks, and can hardly meet the needs of users and administrators of disks.

In order to at least partially solve the above problems and one or more of other potential problems, the embodiments of the present disclosure propose a method for monitoring the health condition of a disk at a fine granularity and thereby performing failure determining and failure handling for the disk. In general, in the embodiments of the present disclosure, a disk including a large number of sectors may be divided into, for example, sector sets of the same size, and these sector sets may be called storage blocks and may be used as virtual disks. In addition, in the embodiments of the present disclosure, it is possible to focus on the health condition of sectors or sector sets in a disk, rather than the health condition of the entire disk.

Sector failures of sectors in a disk may include silent failures and input/output access failures.

The silent failure of a sector of a disk refers to a failure occurring during an idle period without any access to the sector, which is more common in disk back-up/archiving scenarios. However, it is generally difficult to identify a silent failure without access to the sector. When the number of sectors with such failures increases, the storage reliability of the entire system will be seriously affected. For example, when a read is performed on a disk on a certain day, if it is found that a redundant array of independent disks has too many failures that cannot be recovered, a data link failure will be caused. An existing solution is to periodically clean up the entire disk, but this may bring unexpected additional central processing unit or input and output costs.

The input/output access failure of a disk refers to the slow input and output access to the disk caused by a failed sector, which is caused by the retry and recovery of internal commands of the disk.

With regard to the above problems and other potential problems, the present disclosure is not only concerned with how to determine a failed sector set in a disk and with how to determine a sector set failure type of the failed sector set, but further concerned with how to perform different failure handling on a disk including a failed sector set or on a failed sector set therein based on different sector set failure types. In the embodiments of the present disclosure, a disk failure data set including, for example, backend medium scan logs, is used to identify failed sectors in a disk, a failure determining model is constructed and trained to predict a sector set in the disk where a failure will occur and a sector set failure type, and different failure handling is performed on the disk including the failed sector set or on the failed sector set therein based on the sector set failure type, so that the most reasonable, low-cost, and efficient way of disk failure handling can be selected.

FIG. 1 illustrates a schematic block diagram of model training environment 100 in which the model training method in some embodiments of the present disclosure may be implemented. According to an embodiment of the present disclosure, model training environment 100 may be a cloud environment.

As shown in FIG. 1, model training environment 100 includes computing device 110. In model training environment 100, training related data 120 including, for example, a plurality of disk failure data sets associated with at least one failed sector of a disk that are collected in a first time period, another disk failure data set associated with the at least one failed sector that is collected at a predetermined time point after the first time period and that indicates failure information about at least one failed sector set to which the at least one failed sector belongs, or a part of the foregoing data, is provided to computing device 110 as an input to computing device 110. According to an embodiment of the present disclosure, training related data 120 may also include other related data, parameters, and the like required for training failure determining model 130.

Computing device 110 may interact with failure determining model 130. For example, computing device 110 may provide at least part of training related data 120 to failure determining model 130, receive predicted failure information determined by failure determining model 130 based on training related data 120 from failure determining model 130, and by determining whether the predicted failure information determined by failure determining model 130 matches the failure information indicated by the another disk failure data set, send an instruction to stop training to failure determining model 130.

It should be understood that model training environment 100 is only illustrative and not restrictive, and is extensible or shrinkable. For example, model training environment 100 may include more computing devices 110, more training related data 120 may be provided to computing devices 110 as an input, and computing devices 110 may also interact with more failure determining models 130, so as to meet the demands of utilizing more computing devices 110 simultaneously by more users, and even training failure determining models 130 by using more training related data 120 simultaneously or non-simultaneously.

In model training environment 100 shown in FIG. 1, the input of training related data 120 to computing device 110 and the interaction between computing device 110 and failure determining model 130 may be performed via a network.

Computing device 110, training related data 120, and failure determining model 130 included in FIG. 1 are taken as examples below to illustrate model training method 200, model training method 300, failure determining method 400, and failure handling method 500 illustrated in FIGS. 2, 3, 4, and 5.

Figure 2:
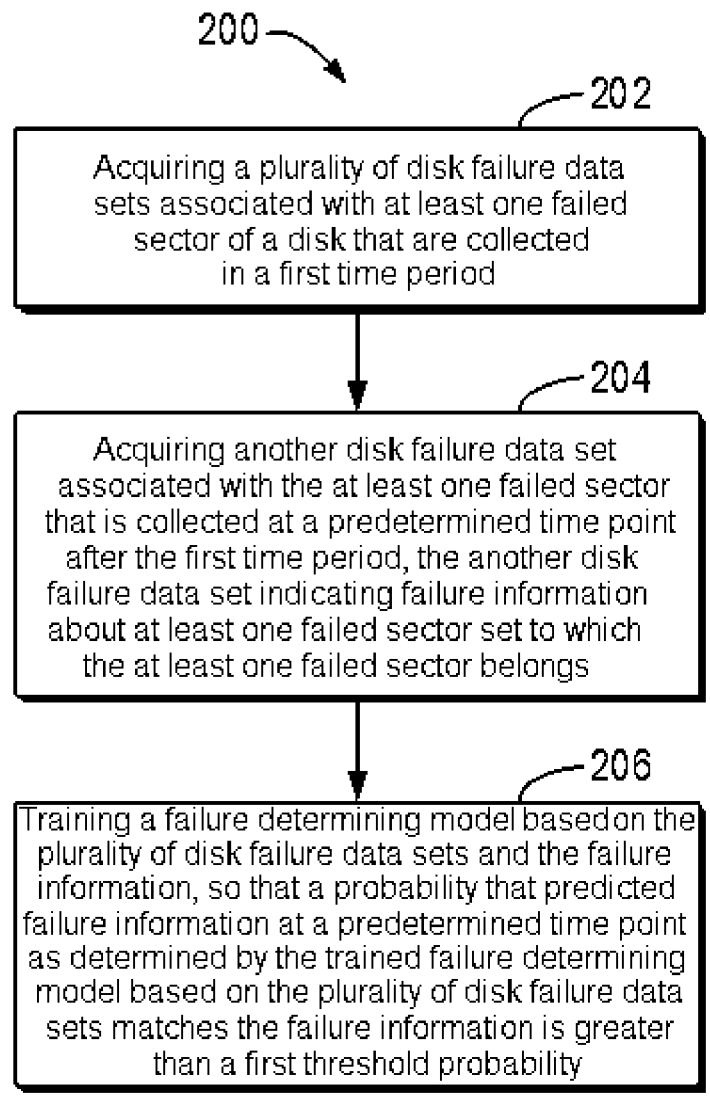
FIG. 2 illustrates a flow chart of model training method 200 according to an embodiment of the present disclosure.

FIG. 2 illustrates a flow chart of model training method 200 according to embodiments of the present disclosure. Method 200 may be implemented by computing device 110 shown in FIG. 1, or by other appropriate devices. It should be understood that model training method 200 may also include additional steps not shown and/or may omit the steps shown, and the scope of the embodiments of the present disclosure is not limited in this regard.

At block 202, computing device 110 acquires a plurality of disk failure data sets associated with at least one failed sector of a disk that are collected in a first time period. According to an embodiment of the present disclosure, acquiring the plurality of disk failure data sets may include acquiring at least one of the following parameters about each failed sector in the at least one failed sector and collected at a first time point in the first time period: backend medium scan logs; a log count indicating the number of backend medium scan logs associated with the failed sector in the backend medium scan logs; a failure count of a sector set to which the failed sector belongs; and a failure count of a sector set adjacent to the sector set to which the failed sector belongs. According to an embodiment of the present disclosure, the first time point in the first time period may refer to a time point at which any disk failure data set in the plurality of disk failure data sets is collected in the first time period, and the sector set adjacent to the sector set to which the failed sector belongs may refer to a predetermined number of adjacent sector sets before and/or after the sector set to which the failed sector belongs according to addresses in the disk.

The backend medium scan (BMS) is a backend scan mechanism inside disk firmware. Failed sectors in a disk may be determined through the backend medium scan. The failed sectors include sectors that are difficult to read or recover, sectors that cannot be read or recovered, and sectors in which associated logs have problems. Through the backend medium scan, a backend medium scan log may be generated for each sector in the disk every time a failure occurs. In other words, if there are three failures in a certain sector of a disk, three backend medium scan logs will be generated for this sector through the backend medium scan. The aforementioned log count may be used to reflect the number of backend medium scan logs generated for the same sector.

The backend medium scan log may include at least one of the following: power-on time (POM) indicating total power-on time of the disk when the failed sector fails; an identifier of the failed sector; and a failure type of the failed sector. The identifier of the failed sector may include, for example, a logical block address for indicating the failed sector. The failure type of the failed sector may include, for example, a sector medium failure or a sector recovery failure, which may be indicated by the SENSE KEY field in the backend medium scan log. When a sector in a disk cannot be read or written due to a medium defect, the sector medium failure will occur. When a command is successfully completed, but a retry or error correction within the disk firmware is required to retrieve data, the sector recovery failure will occur.

At block 204, computing device 110 acquires another disk failure data set associated with the at least one failed sector that is collected at a predetermined time point after the first time period. According to an embodiment of the present disclosure, the another disk failure data set indicates failure information about at least one failed sector set to which the at least one failed sector belongs.

According to an embodiment of the present disclosure, the manner of collecting the plurality of disk failure data sets in the first time period may be the same as the manner of collecting the another disk failure data set at a predetermined time point after the first time period. Moreover, an interval time for collecting two adjacent disk failure data sets in the plurality of disk failure data sets may be the same as an interval time from the end of the first time period to the foregoing predetermined time point. In other words, collecting the plurality of disk failure data sets may refer to the first N times of collecting, and collecting the another disk failure data set may refer to the (N+1)th time of collecting.

According to the embodiments of the present disclosure, a failed sector in a disk may have a high spatial locality, and failed sectors may have a high correlation, which means that a failed sector or a failed sector set adjacent to the failed sector or the failed sector set will often be detected to have a failure in a next backend medium scan. In an example, all failed sectors may be concentrated in a small area, and the area only accounts for 0.0014% of the total disk capacity.

At block 206, computing device 110 trains a failure determining model based on the plurality of disk failure data sets and the failure information, so that a probability that predicted failure information at a predetermined time point as determined by the trained failure determining model based on the plurality of disk failure data sets matches the failure information is greater than a first threshold probability.

According to an embodiment of the present disclosure, the failure determining model may be a machine learning model constructed based on the random forest method and used to predict a failed sector set.

According to an embodiment of the present disclosure, block 202 and block 204 involve acquiring samples for training a failure determining model. Block 202 involves acquiring data required for determining failure information, and block 204 involves acquiring a reference standard answer used to confirm whether the predicted failure information determined by the trained failure determining model is correct. Therefore, at block 206, computing device 110 may continuously adjust parameters of the failure determining model in training, so that the probability that the predicted failure information at a predetermined time point as determined by the trained failure determining model based on the plurality of disk failure data sets matches the failure information is greater than the first threshold probability, that is, the predicted failure information converges to the failure information indicated by the another disk failure data set obtained at block 204.

Figure 3:
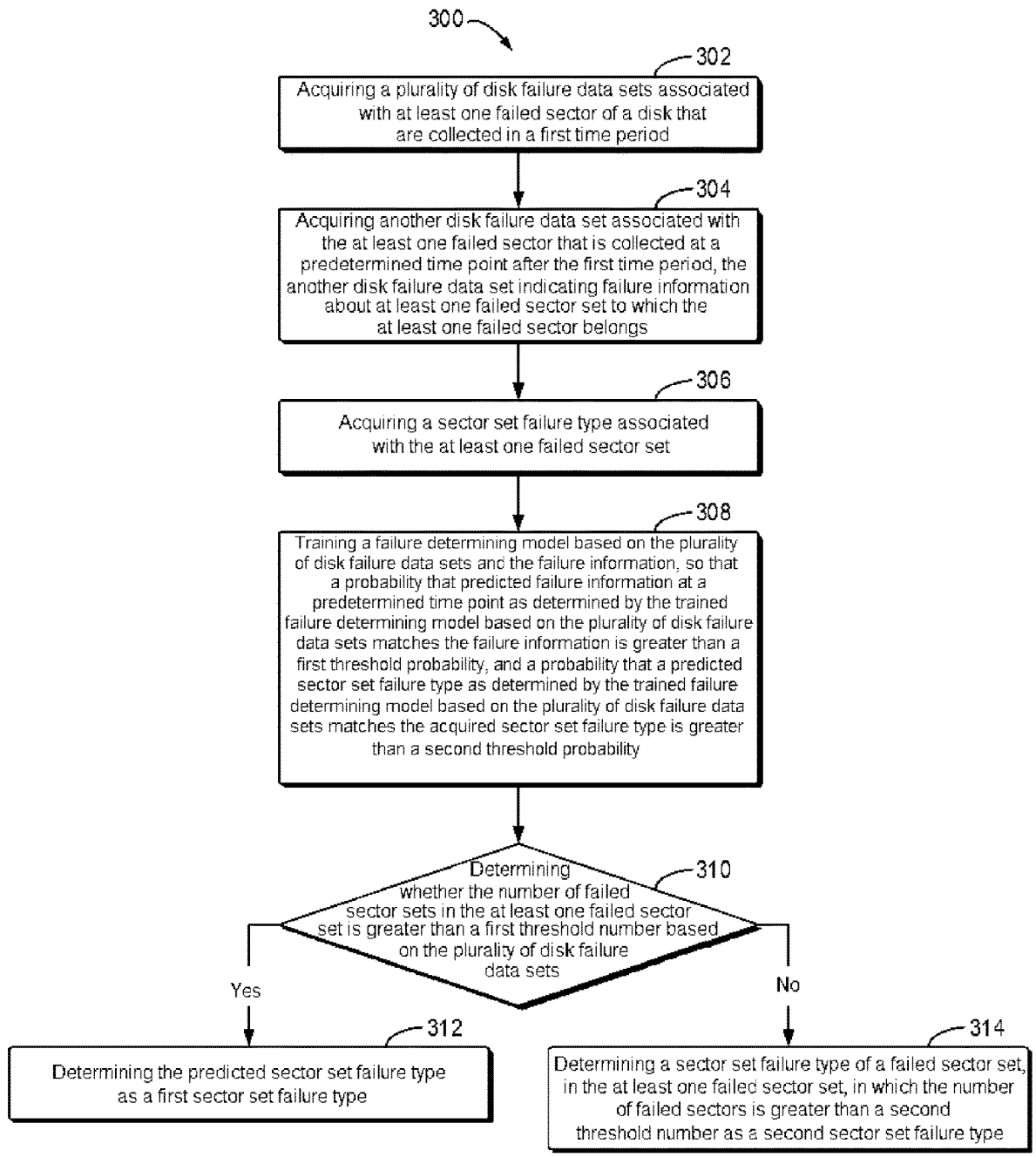
FIG. 3 illustrates a flow chart of model training method 300 according to an embodiment of the present disclosure.

FIG. 3 illustrates a flow chart of model training method 300 according to embodiments of the present disclosure. Method 300 may be implemented by computing device 110 shown in FIG. 1, or by other appropriate devices. It should be understood that model training method 300 may also include additional steps not shown and/or may omit the steps shown, and the scope of the embodiments of the present disclosure is not limited in this regard.

At block 302, computing device 110 acquires a plurality of disk failure data sets associated with at least one failed sector of a disk that are collected in a first time period. The content involved at block 302 is the same as the content involved at block 202, and will not be repeated here.

At block 304, computing device 110 acquires another disk failure data set associated with the at least one failed sector that is collected at a predetermined time point after the first time period. The content involved at block 304 is the same as the content involved at block 204, and will not be repeated here.

At block 306, computing device 110 acquires a sector set failure type associated with at least one failed sector set. According to an embodiment of the present disclosure, block 302 also involves acquiring data required for determining failure information, and block 304 also involves acquiring a reference standard answer for confirming whether the predicted failure information determined by the trained failure determining model is correct, and therefore, the sector set failure type associated with the at least one failed sector set may be a manually marked sector set failure type.

At block 308, computing device 110 trains a failure determining model based on the plurality of disk failure data sets and the failure information, so that a probability that predicted failure information at a predetermined time point as determined by the trained failure determining model based on the plurality of disk failure data sets matches the failure information is greater than a first threshold probability, and a probability that a predicted sector set failure type as determined by the trained failure determining model based on the plurality of disk failure data sets matches the acquired sector set failure type is greater than a second threshold probability. The content involved at block 308, that is, computing device 110 trains the failure determining model based on the plurality of disk failure data sets and the failure information such that the probability that the predicted failure information at a predetermined time point as determined by the trained failure determining model based on the plurality of disk failure data sets matches the failure information is greater than the first threshold probability, is the same as the content involved at block 206, and will not be repeated here.

According to an embodiment of the present disclosure, block 302, block 304, and block 306 involve acquiring samples for training the failure determining model. Block 306 involves acquiring a reference standard answer for confirming whether the predicted sector set failure type determined by the trained failure determining model is correct. Therefore, at block 308, computing device 110 may continuously adjust the parameters of the failure determining model in training, so that the probability that the predicted sector set failure type as determined by the trained failure determining model based on the plurality of disk failure data sets matches the acquired sector set failure type is greater than the second threshold probability, that is, the predicted sector set failure type converges to the sector set failure type acquired at block 306.

At block 310, computing device 110 determines whether the number of failed sector sets in the at least one failed sector set is greater than a first threshold number based on the plurality of disk failure data sets. When computing device 110 determines that the number of failed sector sets in the at least one failed sector set is greater than the first threshold number based on the plurality of disk failure data sets, method 300 proceeds to block 312. Otherwise, method 300 proceeds to block 314.

According to an embodiment of the present disclosure, the first threshold number may be a preset number that is set according to the number of sector sets included in the disk. The larger the number of sector sets included in the disk is, the larger the first threshold number may be.

At block 312, computing device 110 determines the predicted sector set failure type as a first sector set failure type. According to an embodiment of the present disclosure, the first sector set failure type indicates that the number of the failed sector sets in the disk is relatively large.

At block 314, computing device 110 determines a sector set failure type of the failed sector set, in the at least one failed sector set, in which the number of failed sectors is greater than a second threshold number as a second sector set failure type.

According to an embodiment of the present disclosure, the second threshold number may be a preset number set according to the number of sectors in the sector sets included in the disk. The larger the number of sectors included in the sector sets is, the larger the second threshold number may be.

According to an embodiment of the present disclosure, the second sector set failure type indicates that the number of failed sectors in a certain sector set is relatively large.

According to an embodiment of the present disclosure, when a certain failed sector set is neither of the first sector set failure type nor of the second sector set failure type, computing device 110 may determine this failed sector set as a third sector type, and the third sector set failure type indicates that the number of failed sectors in a certain sector set is small.

It should be understood that method 300 includes more steps than method 200 and may be considered as an extension of method 200.

Figure 4:
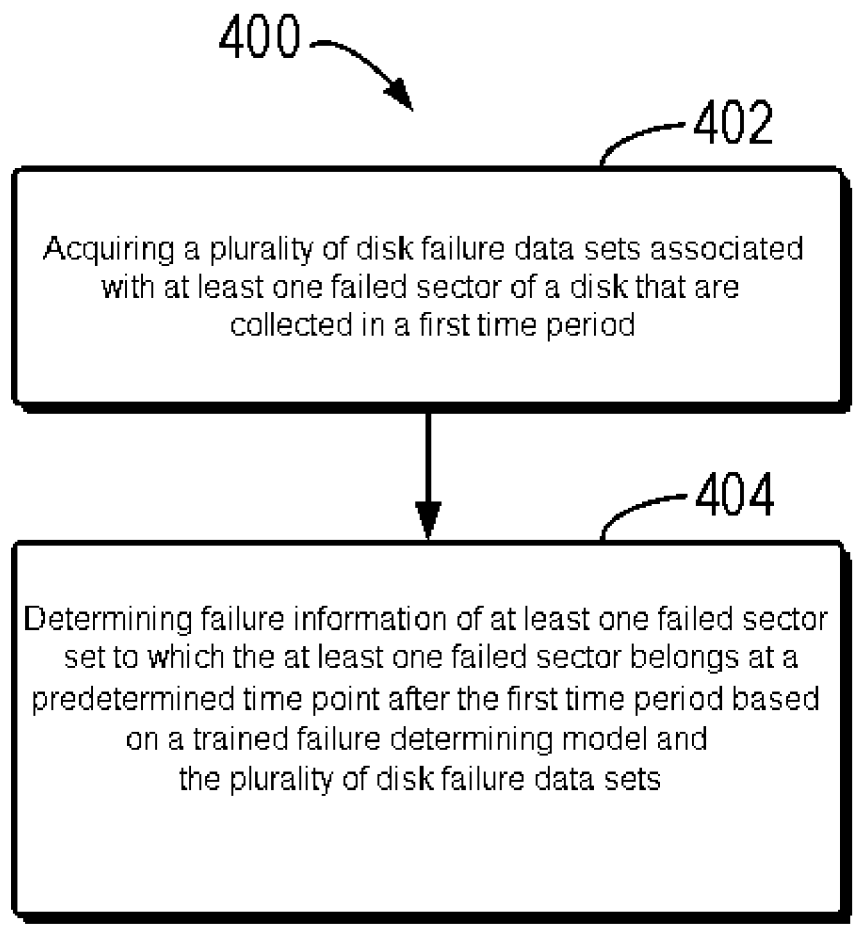
FIG. 4 illustrates a flow chart of failure determining method 400 according to an embodiment of the present disclosure.

FIG. 4 illustrates a flow chart of failure determining method 400 according to an embodiment of the present disclosure. Method 400 may be implemented by computing device 110 shown in FIG. 1, or by other appropriate devices. It should be understood that failure determining method 400 may also include additional steps not shown and/or may omit the steps shown, and the scope of the embodiments of the present disclosure is not limited in this regard.

At block 402, computing device 110 acquires a plurality of disk failure data sets associated with at least one failed sector of a disk that are collected in a first time period. The content involved at block 402 is the same as the content involved at block 202 and block 302, and will not be repeated here.

At block 404, computing device 110 determines failure information of at least one failed sector set to which the at least one failed sector belongs at a predetermined time point after the first time period based on the trained failure determining model obtained according to model training method 200 or model training method 300 and the plurality of disk failure data sets acquired at block 402.

According to an embodiment of the present disclosure, determining the failure information of the at least one failed sector set to which the at least one failed sector belongs at a predetermined time point after the first time period may include determining the foregoing failure information and a sector set failure type associated with the at least one failed sector set.

According to some embodiments of the present disclosure, determining the sector set failure type may include: if it is determined that the number of failed sector sets in the at least one failed sector set is greater than a first threshold number, determining the sector set failure type as a first sector set failure type.

According to some other embodiments of the present disclosure, determining the sector set failure type may include: if it is determined that the number of failed sector sets in the at least one failed sector set is less than or equal to the first threshold number, determining the sector set failure type of a failed sector set, in the at least one failed sector set, in which the number of failed sectors is greater than a second threshold number as a second sector set failure type.

Figure 5:
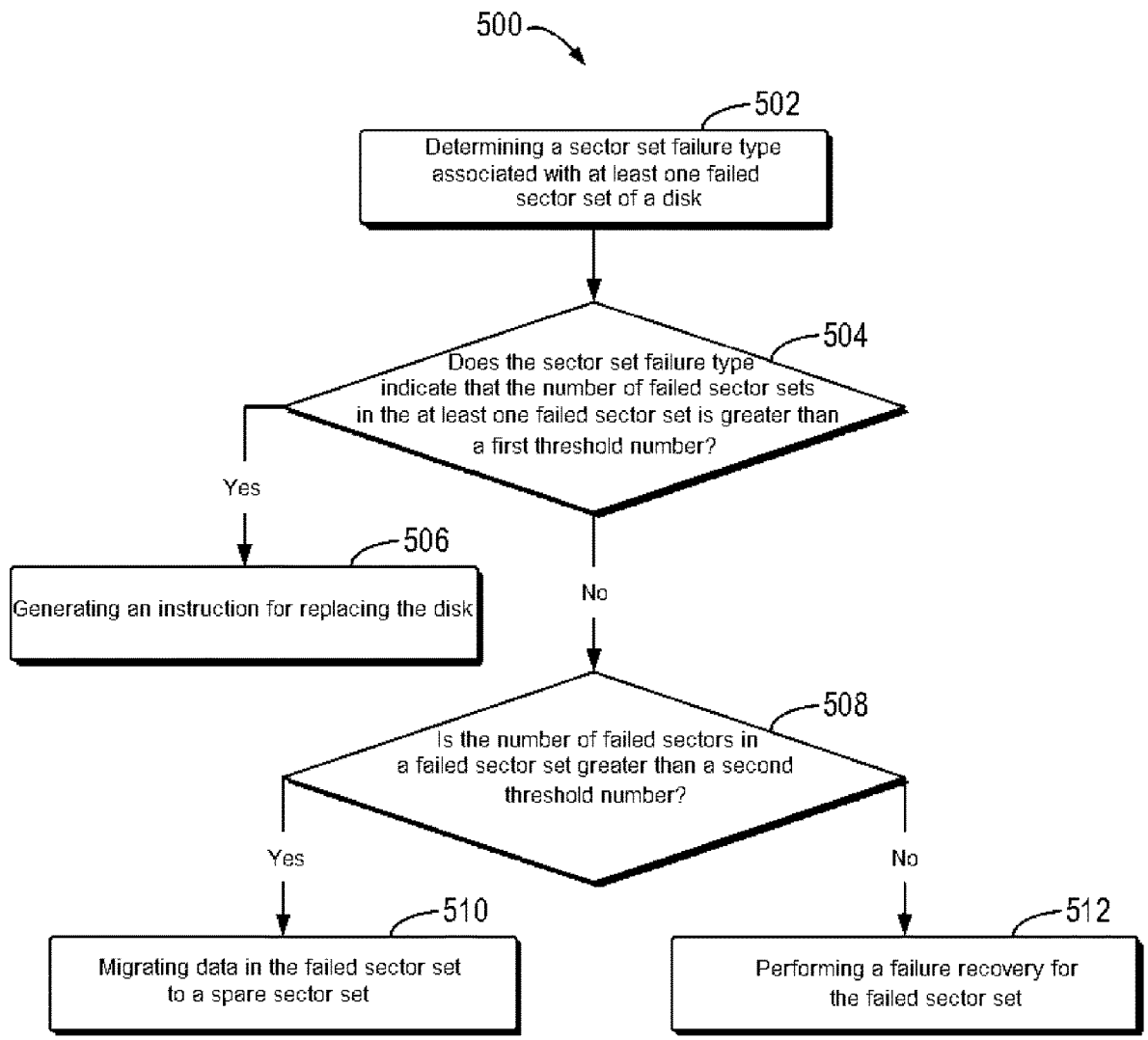
FIG. 5 illustrates a flow chart of failure handling method 500 according to an embodiment of the present disclosure.

FIG. 5 illustrates a flow chart of failure determining method 500 according to an embodiment of the present disclosure. Method 500 may be implemented by computing device 110 shown in FIG. 1, or by other appropriate devices. It should be understood that failure determining method 500 may also include additional steps not shown and/or may omit the steps shown, and the scope of the embodiments of the present disclosure is not limited in this regard.

At block 502, computing device 110 determines a sector set failure type associated with at least one failed sector set of a disk. According to an embodiment of the present disclosure, each of the at least one failed sector set includes at least one failed sector.

According to an embodiment of the present disclosure, computing device 110 may determine the sector set failure type in accordance with failure determining method 400. For example, the sector set failure type may be associated with at least one failed sector set to which the at least one failed sector of the disk belongs at a predetermined time point after a first time period, and computing device 110 may first acquire a plurality of disk failure data sets associated with the at least one failed sector that are collected in the first time period, and then determine the sector set failure type based on a trained failure determining model obtained according to model training method 200 or model training method 300 and the acquired plurality of disk failure data sets.

According to an embodiment of the present disclosure, the sector set failure type determined by computing device 110 may include, for example, a first sector set failure type indicating that the number of failed sector sets in the at least one failed sector set is greater than a first threshold number, and a second sector set failure type indicating that the number of failed sector sets in the at least one failed sector set is less than or equal to the first threshold number, and for a failed sector set, in the at least one failed sector set, in which the number of failed sectors is greater than the second threshold number.

According to an embodiment of the present disclosure, acquiring the plurality of disk failure data sets may include, for example, acquiring at least one of the following parameters about each failed sector in the at least one failed sector and collected at a first time point in the first time period: backend medium scan logs; a log count indicating the number of backend medium scan logs associated with the failed sector in the backend medium scan logs; a failure count of a sector set to which the failed sector belongs; and a failure count of a sector set adjacent to the sector set to which the failed sector belongs. The backend medium scan log may include at least one of the following: power-on time indicating total power-on time of the disk when the failed sector fails; an identifier of the failed sector; and a failure type of the failed sector. The failure type of a sector may include, for example: a sector medium failure or a sector recovery failure.

According to an embodiment of the present disclosure, computing device 110 may first acquire another disk failure data set associated with the at least one failed sector that is collected at a predetermined time point after the first time period, the another disk failure data set indicating failure information about at least one failed sector set to which the at least one failed sector belongs. Thereafter, computing device 110 may train a failure determining model based on the plurality of disk failure data sets and the failure information, so that a probability that predicted failure information at a predetermined time point as determined by the trained failure determining model based on the plurality of disk failure data sets matches the failure information is greater than a first threshold probability. In this manner, computing device 110 may implement the obtaining of the trained failure determining model by training the failure determining model.

According to an embodiment of the present disclosure, in the process of training the failure determining model, computing device 110 may train the failure determining model so that a probability that a predicted sector set failure type as determined by the trained failure determining model based on the plurality of disk failure data sets matches the acquired sector set failure type is greater than a second threshold probability.

At block 504, computing device 110 determines whether the sector set failure type indicates that the number of failed sector sets in the at least one failed sector set is greater than a first threshold number. When the sector set failure type indicates that the number of failed sector sets in the at least one failed sector set is greater than a first threshold number, method 500 proceeds to block 506. Otherwise, method 500 proceeds to block 508.

According to an embodiment of the present disclosure, the first threshold number may be a preset number that is set according to the number of sector sets included in the disk. The larger the number of sector sets included in the disk is, the larger the first threshold number may be.

At block 506, computing device 110 generates an instruction for replacing the disk. According to an embodiment of the present disclosure, when the number of failed sector sets in the at least one failed sector set is greater than the first threshold number, it indicates that there are widespread failed sectors in the disk, and at this point it would be costly and time consuming to either perform failure recovery for all failed sectors or migrate data from the failed sector sets where failed sectors exist, and therefore it would be the most economical and efficient to adopt the way of replacing the disk.

According to some embodiments of the present disclosure, after generating an instruction for replacing the disk, computing device 110 may send this instruction to the user or administrator of the disk through various human-machine interfaces.

According to some other embodiments of the present disclosure, after generating an instruction for replacing the disk, computing device 110 may directly initiate, based on this instruction, the operation of replacing the disk, for example, via an automated robotic arm, etc.

According to an embodiment of the present disclosure, after computing device 110 receives confirmation information for disk replacement from the user or administrator of the disk, or confirms on its own that it will perform the disk replacement, it may migrate the data in the disk to another disk and later replace, with another disk, the disk to be replaced.

At block 508, computing device 110 determines, for each of the at least one failed sector set of the disk, whether the number of failed sectors in this failed sector set is greater than a second threshold number. When computing device 110 determines, for one of the at least one failed sector set of the disk, that the number of failed sectors in this failed sector set is greater than the second threshold number, method 500 proceeds to block 510. Otherwise, method 500 proceeds to block 512.

According to an embodiment of the present disclosure, the second threshold number may be a preset number set according to the number of sectors in the sector sets included in the disk. The larger the number of sectors included in the sector sets is, the larger the second threshold number may be.

At block 510, computing device 110 migrates the data in the failed sector set determined at block 508 in which the number of failed sectors is greater than the second threshold number to a spare sector set. According to an embodiment of the present disclosure, if the number of failed sectors in a failed sector set is greater than the second threshold number, it indicates that there are widespread failed sectors in this failed sector set, and at this point it would be costly and time consuming to perform failure recovery for all failed sectors, and therefore it is the most economical and efficient to adopt the way of migrating data from the failed sector set.

According to an embodiment of the present disclosure, the failed sector set in which the number of failed sectors is greater than the second threshold number may be located in a storage pool, and computing device 110 may select a spare sector set from this storage pool.

At block 512, computing device 110 performs a failure recovery for the failed sector set determined at block 508 in which the number of failed sectors is less than or equal to the second threshold number. According to an embodiment of the present disclosure, if the number of failed sectors in a failed sector set is less than or equal to the second threshold number, it indicates that there are a relatively small number of failed sectors in this failed sector set, and at this point, the way of migrating data from the failed sector set would instead lead to high expense and time costs, so a failure recovery may be performed on this failed sector set.

According to some embodiments of the present disclosure, when computing device 110 performs a failure recovery on the failed sector set, the failed sector set may be considered as a whole, and the failure recovery may be performed on the failed sector set as a whole.

According to some other embodiments of the present disclosure, when computing device 110 performs a failure recovery on the failed sector set, computing device 110 may first circle the failed sectors in the failed sector set and perform the failure recovery on those failed sectors sequentially, randomly, or simultaneously. In this way, it is possible to further reduce the computational and time costs required to perform a failure recovery relative to the previous way.

According to an embodiment of the present disclosure, whether performing disk slowdown, data migration from a failed sector set, or a failure recovery for a failed sector set, computing device 110 may perform it in response to that the disk or corresponding sector sets enter an idle state, thereby reducing the impact on the normal operation of the disk or sector sets.

The related content of model training environment 100 in which the device and/or the method according to an embodiment of the present disclosure may be implemented, model training method 200 according to an embodiment of the present disclosure, model training method 300 according to an embodiment of the present disclosure, failure determining method 400 according to an embodiment of the present disclosure, and failure handling method 500 according to an embodiment of the present disclosure are described above with reference to FIGS. 1 to 5. It should be understood that the above description is to better demonstrate the content recorded in the embodiments of the present disclosure, and is not intended to limit the present disclosure in any way.

It should be understood that the numbers of various elements and the magnitudes of physical quantities used in the embodiments of the present disclosure and the drawings are only examples, and are not intended to limit the protection scope of the embodiments of the present disclosure. The above numbers and magnitudes may be arbitrarily set as needed without affecting the normal implementation of the embodiments of the present disclosure.

Through the above description with reference to FIGS. 1 to 5, according to the technical solutions of the embodiments of the present disclosure, a model training method, a failure determining method, and a failure handling method are proposed, which may predict, based on a disk failure data set associated with a failed sector, information of a failure that will occur on a sector set included in the disk, and therefore the user or administrator of the disk can be informed in advance of the failure condition that will occur in the sector set of the disk. In addition, based on the model training method and the failure determining method proposed in the technical solutions of the embodiments of the present disclosure, the sector set failure type of the failed sector set may also be determined, so that the user or administrator of the disk can be informed in advance of the failure type that the sector set of the disk will have. Further, based on the model training method, the failure determining method, and the failure handling method according to the technical solutions of the embodiments of the present disclosure, different failure handling may be performed on a disk including a failed sector set or on a failed sector set therein based on the sector set failure type, so that the most reasonable, low-cost, and efficient way of disk failure handling can be selected.

Technical effects of the failure determining method according to an embodiment of the present disclosure will be described below in conjunction with two examples by using a true positive rate (TPR) and a false positive rate (FPR). In the examples of the present disclosure, the true positive rate refers to the percentage of correctly identified sector sets that will fail in the future, and the false positive rate refers to the percentage of incorrectly identified sector sets that will not fail in the future. In the two examples, for a 4 TB disk with firmware "GS1F," the true positive rate of failure determination based on the collected disk failure data set reaches 98.21%, while the false positive rate is only 0.913%. For an 8 TB disk with firmware "UM02," the true positive rate of failure determination based on the collected disk failure data set reaches 98.17%, while the false positive rate is only 0.4%. It can be seen that the failure determining method according to the present disclosure has very high credibility.

Figure 6:
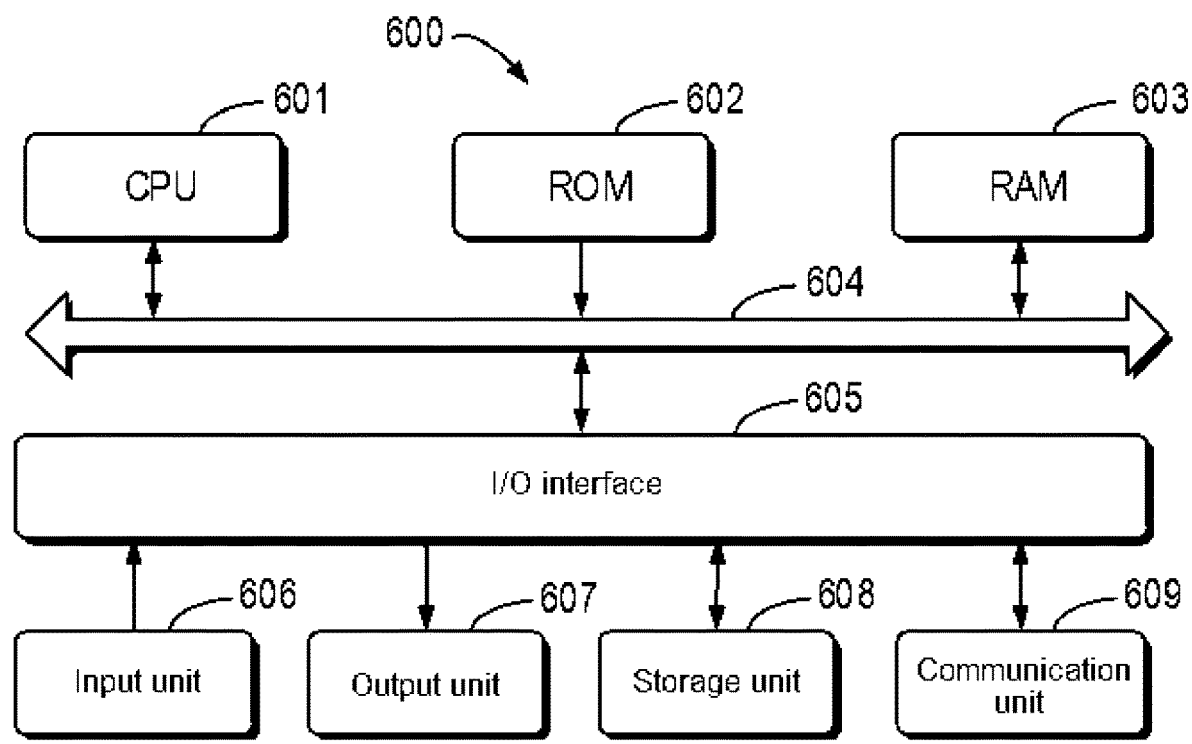
FIG. 6 illustrates a schematic block diagram of example device 600 that may be used to implement the embodiments of the present disclosure.

FIG. 6 illustrates a schematic block diagram of example device 600 that may be used to implement embodiments of the present disclosure. According to an embodiment of the present disclosure, computing device 110 in FIG. 1 may be implemented by device 600. As shown in the figure, device 600 includes central processing unit (CPU) 601 that may perform various appropriate actions and processing according to computer program instructions stored in read-only memory (ROM) 602 or computer program instructions loaded from storage unit 608 to random access memory (RAM) 603. In RAM 603, various programs and data required for the operation of device 600 may also be stored. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as methods 200, 300, 400, and 500, may be performed by processing unit 601. For example, in some embodiments, methods 200, 300, 400, and 500 may be implemented as a computer software program that is tangibly included in a machine-readable medium such as storage unit 608. In some embodiments, part of or all the computer program may be loaded and/or installed onto device 600 via ROM 602 and/or communication unit 609. When the computer program is loaded into RAM 603 and executed by CPU 601, one or more actions of methods 200, 300, 400, and 500 described above may be executed.

The embodiments of the present disclosure may relate to a method, a device, a system, and/or a computer program product. The computer program product may include a computer-readable storage medium on which computer-readable program instructions for performing various aspects of the embodiments of the present disclosure are loaded.

The computer-readable storage medium may be a tangible device that may hold and store instructions used by an instruction-executing device. An example of the computer-readable storage medium may include, but is not limited to an electrical storage device, a magnetic storage device, an optical storage device, an electromagnetic storage device, a semiconductor storage device, or any suitable combination thereof. More specific examples of the computer-readable storage medium as a non-exhaustive list include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage media used herein are not to be interpreted as transient signals per se, such as radio waves or other freely propagating electromagnetic waves, electromagnetic waves propagating through waveguides or other transmission media, for example, light pulses through fiber optic cables, or electrical signal transmitted via electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the embodiments of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where the remote computer is involved, the remote computer may be connected to the user computer over any kind of networks, including the local area network (LAN) or the wide area network (WAN), or may be connected to an external computer, for example, through the Internet by using an Internet service provider. In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the embodiments of the present disclosure.

Various aspects of the embodiments of the present disclosure are described here with reference to the flow charts and/or block diagrams of the method, the device/system, and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A failure handling method, comprising:
   determining a sector set failure type associated with at least one failed sector set of a disk, wherein the sector set failure type is associated with at least one failed sector set to which at least one failed sector of the disk belongs at a predetermined time point after a first time period, and wherein the determining the sector set failure type comprises:
      acquiring a plurality of disk failure data sets associated with the at least one failed sector that are collected in the first time period; and
      determining the sector set failure type based on a trained failure determining model and the plurality of disk failure data sets;
   in response to determining the sector set failure type indicates that a number of failed sector sets in the at least one failed sector set is greater than a first threshold number, generating an instruction for replacing the disk; and
   in response to determining the sector set failure type indicates that the number of failed sector sets in the at least one failed sector set is less than or equal to the first threshold number, performing at least one of:
      in response to determining a number of failed sectors is greater than a second threshold number and less than or equal to the first threshold number in a failed sector set in the at least one failed sector set, migrating data from the failed sector set, in the at least one failed sector set, in which the number of failed sectors is greater than the second threshold number and less than or equal to the first threshold number, to a spare sector set, wherein the second threshold number is less than the first threshold number, or
      performing a failure recovery for a failed sector set, in the at least one failed sector set, in which the number of failed sectors is less than or equal to the second threshold number.

2. The method according to claim 1, wherein acquiring the plurality of disk failure data sets comprises:
   acquiring at least one of the following parameters about each failed sector in the at least one failed sector and collected at a first time point in the first time period:
      backend medium scan logs,
      a log count indicating a number of backend medium scan logs associated with the failed sector in the backend medium scan logs,
      a failure count of a sector set to which the failed sector belongs, or
      a failure count of a sector set adjacent to the sector set to which the failed sector belongs.

3. The method according to claim 2, wherein the backend medium scan log comprises at least one of the following:
   power-on time indicating total power-on time of the disk when the failed sector fails;
   an identifier of the failed sector; or
   a failure type of the failed sector.

4. The method according to claim 3, wherein the failure type of a sector comprises:
   a sector medium failure; or
   a sector recovery failure.

5. The method according to claim 1, further comprising obtaining the trained failure determining model by training a failure determining model, including:
   acquiring another disk failure data set associated with the at least one failed sector that is collected at the predetermined time point after the first time period, the another disk failure data set indicating failure information about at least one failed sector set to which the at least one failed sector belongs; and
   training the failure determining model based on the plurality of disk failure data sets and the failure information, so that a probability that predicted failure information at the predetermined time point as determined by the trained failure determining model based on the plurality of disk failure data sets matches the failure information is greater than a first threshold probability.

6. The method according to claim 5, wherein training the failure determining model further comprises:
   training the failure determining model so that a probability that a predicted sector set failure type as determined by the trained failure determining model based on the plurality of disk failure data sets matches an acquired sector set failure type is greater than a second threshold probability.

7. An electronic device, comprising:
   at least one processing unit; and
   at least one memory coupled to the at least one processing unit and storing instructions for execution by the at least one processing unit, wherein the instructions, when executed by the at least one processing unit, cause the device to perform actions comprising:
      determining a sector set failure type associated with at least one failed sector set of a disk, wherein the sector set failure type is associated with at least one failed sector set to which at least one failed sector of the disk belongs at a predetermined time point after a first time period, and wherein the determining the sector set failure type comprises:
         acquiring a plurality of disk failure data sets associated with the at least one failed sector that are collected in the first time period; and
         determining the sector set failure type based on a trained failure determining model and the plurality of disk failure data sets;
      in response to determining the sector set failure type indicates that a number of failed sector sets in the at least one failed sector set is greater than a first threshold number, generating an instruction for replacing the disk; and
      in response to determining the sector set failure type indicates that the number of failed sector sets in the at least one failed sector set is less than or equal to the first threshold number, performing at least one of:
         in response to determining a number of failed sectors is greater than a second threshold number and less than or equal to the first threshold number in a failed sector set in the at least one failed sector set, migrating data from the failed sector set, in the at least one failed sector set, in which the number of failed sectors is greater than the second threshold number and less than or equal to the first threshold number, to a spare sector set, wherein the second threshold number is less than the first threshold number, or performing a failure recovery for a failed sector set, in the at least one failed sector set, in which the number of failed sectors is less than or equal to the second threshold number.

8. The electronic device according to claim 7, wherein acquiring the plurality of disk failure data sets comprises:
acquiring at least one of the following parameters about each failed sector in the at least one failed sector and collected at a first time point in the first time period:
backend medium scan logs,
a log count indicating the number of backend medium scan logs associated with the failed sector in the backend medium scan logs,
a failure count of a sector set to which the failed sector belongs, or
a failure count of a sector set adjacent to the sector set to which the failed sector belongs.

9. The electronic device according to claim 8, wherein the backend medium scan log comprises at least one of the following:
power-on time indicating total power-on time of the disk when the failed sector fails;
an identifier of the failed sector; or
a failure type of the failed sector.

10. The electronic device according to claim 9, wherein the failure type of a sector comprises:
a sector medium failure; or
a sector recovery failure.

11. The electronic device according to claim 7, wherein the actions further comprise obtaining the trained failure determining model by training a failure determining model, including:
acquiring another disk failure data set associated with the at least one failed sector that is collected at the predetermined time point after the first time period, the another disk failure data set indicating failure information about at least one failed sector set to which the at least one failed sector belongs; and
training the failure determining model based on the plurality of disk failure data sets and the failure information, so that a probability that predicted failure information at the predetermined time point as determined by the trained failure determining model based on the plurality of disk failure data sets matches the failure information is greater than a first threshold probability.

12. The electronic device according to claim 11, wherein training the failure determining model further comprises:
training the failure determining model so that a probability that a predicted sector set failure type as determined by the trained failure determining model based on the plurality of disk failure data sets matches an acquired sector set failure type is greater than a second threshold probability.

13. A non-transitory computer-readable medium having machine-executable instructions stored therein, which when executed by a processor, cause the processor to perform operations, the operations comprising:
determining a sector set failure type associated with at least one failed sector set of a disk, wherein the sector set failure type is associated with at least one failed sector set to which at least one failed sector of the disk belongs at a predetermined time point after a first time period, and wherein the determining the sector set failure type comprises:
acquiring a plurality of disk failure data sets associated with the at least one failed sector that are collected in the first time period; and
determining the sector set failure type based on a trained failure determining model and the plurality of disk failure data sets;
in response to determining the sector set failure type indicates that a number of failed sector sets in the at least one failed sector set is greater than a first threshold number, generating an instruction for replacing the disk; and
in response to determining the sector set failure type indicates that the number of failed sector sets in the at least one failed sector set is less than or equal to the first threshold number, performing at least one of:
in response to determining a number of failed sectors is greater than a second threshold number and less than or equal to the first threshold number in a failed sector set in the at least one failed sector set, migrating data from the failed sector set, in the at least one failed sector set, in which the number of failed sectors is greater than the second threshold number and less than or equal to the first threshold number, to a spare sector set, wherein the second threshold number is less than the first threshold number, or
performing a failure recovery for a failed sector set, in the at least one failed sector set, in which the number of failed sectors is less than or equal to the second threshold number.

14. The computer-readable medium according to claim 13, wherein acquiring the plurality of disk failure data sets comprises:
acquiring at least one of the following parameters about each failed sector in the at least one failed sector and collected at a first time point in the first time period:
backend medium scan logs,
a log count indicating the number of backend medium scan logs associated with the failed sector in the backend medium scan logs,
a failure count of a sector set to which the failed sector belongs, or
a failure count of a sector set adjacent to the sector set to which the failed sector belongs.

15. The computer-readable medium according to claim 14, wherein the backend medium scan log comprises at least one of the following:
power-on time indicating total power-on time of the disk when the failed sector fails;
an identifier of the failed sector; or
a failure type of the failed sector.

16. The computer-readable medium according to claim 15, wherein the failure type of a sector comprises:
a sector medium failure; or
a sector recovery failure.

17. The computer-readable medium according to claim 13, wherein the operations further comprise obtaining the trained failure determining model by training a failure determining model, including:
acquiring another disk failure data set associated with the at least one failed sector that is collected at the predetermined time point after the first time period, the another disk failure data set indicating failure information about at least one failed sector set to which the at least one failed sector belongs; and training the failure determining model based on the plurality of disk failure data sets and the failure information, so that a probability that predicted failure information at the predetermined time point as determined by the trained failure determining model based on the plurality of disk failure data sets matches the failure information is greater than a first threshold probability.

* * * * *